United States Patent
Shimanaka et al.

(10) Patent No.: US 10,525,946 B2
(45) Date of Patent: Jan. 7, 2020

(54) BRAKE CONTROLLER AND METHOD FOR CONTROLLING BRAKE

(71) Applicant: TOYOTA JIDOSHA KABUSHIKI KAISHA, Toyota-shi, Aichi-ken (JP)

(72) Inventors: Yumi Shimanaka, Kasugai (JP); Jun Tsuchida, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/876,757

(22) Filed: Jan. 22, 2018

(65) Prior Publication Data

US 2018/0236988 A1 Aug. 23, 2018

(30) Foreign Application Priority Data

Feb. 21, 2017 (JP) .................. 2017-030129

(51) Int. Cl.
*B60T 8/17* (2006.01)
*B60T 7/20* (2006.01)
*B60T 8/24* (2006.01)
*B60T 8/32* (2006.01)
*B62D 15/02* (2006.01)
(Continued)

(52) U.S. Cl.
CPC .............. *B60T 8/1708* (2013.01); *B60T 7/20* (2013.01); *B60T 7/22* (2013.01); *B60T 8/246* (2013.01); *B60T 8/323* (2013.01); *B60T 13/662* (2013.01); *B62D 15/021* (2013.01); *B60D 1/242* (2013.01); *B60T 2201/022* (2013.01); *B60T 2270/402* (2013.01)

(58) Field of Classification Search
CPC ........ B60T 8/1708; B60T 8/323; B60T 8/246; B60T 7/20; B60T 13/662; B60T 2201/022; B62D 15/021; B60D 1/242
See application file for complete search history.

(56) References Cited

U.S. PATENT DOCUMENTS 5,529,138 A * 6/1996 Shaw ..................... B60K 23/08
180/169
8,538,674 B2 * 9/2013 Breuer ................ B60T 8/17558
340/436
(Continued)

FOREIGN PATENT DOCUMENTS

JP 2007-503352 A 2/2007
JP 2011-025921 A 2/2011
(Continued)

*Primary Examiner* — Xuan Lan Nguyen
(74) *Attorney, Agent, or Firm* — Oliff PLC (57) ABSTRACT

A brake controller is applied to a vehicle that includes a tractor and a trailer. The brake controller includes a first braking unit that controls a first brake device, a second braking unit that controls a second brake device, a distance sensor that detects a distance between the vehicle and an object, an execution unit that controls the first braking unit and the second braking unit in accordance with the distance detected by the distance sensor and executes an automatic brake control, and a prohibition unit that prohibits the execution unit from executing the automatic brake control. The brake controller prohibits execution of the automatic brake control under the condition that the tractor and the trailer are coupled to each other and the second braking unit includes a failure.

6 Claims, 3 Drawing Sheets

(51) Int. Cl.
*B60T 7/22* (2006.01)
*B60T 13/66* (2006.01)
*B60D 1/24* (2006.01)

(56) References Cited

U.S. PATENT DOCUMENTS

| | | | |
|---|---|---|---|
| 8,629,800 B2* | 1/2014 | Anderson | B60Q 1/48 |
| | | | 342/109 |
| 9,207,135 B2* | 12/2015 | Staufer | B60T 7/20 |
| 2002/0075139 A1 | 6/2002 | Yamamoto et al. | |
| 2006/0097569 A1* | 5/2006 | Eberling | B60T 8/323 |
| | | | 303/122.15 |
| 2007/0198190 A1 | 8/2007 | Bauer et al. | |
| 2009/0093928 A1* | 4/2009 | Getman | B60T 8/1755 |
| | | | 701/37 |
| 2011/0022282 A1 | 1/2011 | Wu et al. | |
| 2014/0222288 A1* | 8/2014 | Lavoie | G06F 17/00 |
| | | | 701/41 |
| 2014/0316666 A1* | 10/2014 | Bordes | B60T 7/12 |
| | | | 701/70 |
| 2015/0360655 A1* | 12/2015 | Odate | B60T 7/22 |
| | | | 701/70 |
| 2016/0185325 A1* | 6/2016 | Ike | B60T 7/22 |
| | | | 701/70 |
| 2016/0221549 A1* | 8/2016 | Tanase | B60T 7/22 |

FOREIGN PATENT DOCUMENTS

| | | |
|---|---|---|
| KR | 1995-0018450 B1 | 8/1998 |
| KR | 1998-0036611 A | 8/1998 |
| KR | 1998-0036611 U | 9/1998 |
| KR | 1998-0061792 A | 10/1998 |
| KR | 2002-0046970 A | 6/2002 |

* cited by examiner

BRAKE CONTROLLER AND METHOD FOR CONTROLLING BRAKE

BACKGROUND OF THE INVENTION

The present invention relates to a brake controller and a method for controlling a brake.

Japanese National Phase Laid-Open Patent Publication No. 2007-503352 discloses a vehicle including a tractor and a trailer towed by the tractor. The vehicle includes various devices such as a drive device, a steering device, and a brake device that are used to drive the vehicle. Further, the vehicle includes a distance sensor that measures the distance to an object located near the vehicle. The brake controller communicates with the distance sensor and controls the brake device to brake the vehicle when there is a risk of collision of the vehicle with the object.

The brake controller applied to the vehicle including the tractor and the trailer includes a first brake unit that controls a brake device arranged in the tractor and a second brake unit that controls a brake device arranged in the trailer. When the brake device executes an automatic brake control that automatically brakes the vehicle based on a detection signal of the distance sensor regardless of a brake operation by the driver, the brake device controls the first brake unit to brake the tractor and controls the second brake unit to brake the trailer.

In the brake controller, a failure may occur in the second brake unit that brakes the trailer. In this case, when the brake controller executes the automatic brake control to control the brake device of each of the tractor and the trailer, the brake controller will be able to brake the tractor but have difficulty in braking the trailer. This increases the difference in braking force between the tractor and the trailer and adversely affects the behavior of the vehicle. The brake controller of the above publication does not discuss how the automatic brake control is executed when the second brake unit that brakes the trailer includes a failure. In this regard, there is room for improvement.

SUMMARY OF THE INVENTION

A first aspect provides a brake controller configured to be applied to a vehicle that includes a tractor and a trailer towed by the tractor. The brake controller includes a first braking unit, a second braking unit, a distance sensor, an execution unit, a coupling detection unit, and a prohibition unit. The first braking unit is configured to control a first brake device installed in the tractor. The second braking unit is configured to control a second brake device installed in the trailer. The distance sensor is configured to detect a distance between the vehicle and an object located near the vehicle. The execution unit is configured to control the first braking unit and the second braking unit in accordance with the distance detected by the distance sensor and execute an automatic brake control that brakes the vehicle. The coupling detection unit is configured to detect that the tractor and the trailer are coupled to each other. The failure diagnosis unit is configured to diagnose the second braking unit with a failure. The prohibition unit is configured to prohibit the execution unit from executing the automatic brake control. The prohibition unit is configured to prohibit the execution unit from executing the automatic brake control under the condition that the coupling detection unit has detected that the tractor and the trailer are coupled to each other and the failure diagnosis unit has detected that the second braking unit includes a failure.

The above structure prohibits the automatic brake control when the tractor and the trailer are coupled and a failure is detected in the second actuator control unit that brakes the trailer. This limits increases in the difference in braking force between the tractor and the trailer resulting from the execution of the automatic brake control. Thus, the above structure limits adverse effects on the behavior of the vehicle because the difference in braking force between the tractor and the trailer is limited.

A second aspect provides a brake controller configured to be applied to a vehicle that includes a tractor and a trailer towed by the tractor. The brake controller includes a first braking unit, a second braking unit, a distance sensor, an execution unit, a coupling detection unit, a failure diagnosis unit, a traveling state detection unit, a straight traveling determination unit, and a prohibition unit. The first braking unit is configured to control a first brake device installed in the tractor. The second braking unit is configured to control a second brake device installed in the trailer. The distance sensor is configured to detect a distance between the vehicle and an object located near the vehicle. The execution unit is configured to control the first braking unit and the second braking unit in accordance with the distance detected by the distance sensor and execute an automatic brake control that brakes the vehicle. The coupling detection unit is configured to detect that the tractor and the trailer are coupled to each other. The failure diagnosis unit is configured to diagnose the second braking unit with a failure. The traveling state detection unit is configured to detect a traveling state of the vehicle. The straight traveling determination unit is configured to determine whether or not the traveling state detection unit has detected that the vehicle is traveling straight. The prohibition unit is configured to prohibit the execution unit from executing the automatic brake control. The prohibition unit is configured to prohibit the execution unit from executing the automatic brake control under the condition that the coupling detection unit has detected that the tractor and the trailer are coupled to each other, the failure diagnosis unit has detected that the second braking unit includes a failure, and that the straight traveling determination unit has determined that the vehicle is not traveling straight.

When the vehicle is not traveling straight, that is, when the vehicle is turning along a curved route, the application of brakes to the vehicle will result in the inertial force of the tractor and the inertial force of the trailer acting in different directions. This adversely affects the behavior of the vehicle. When the automatic brake control is executed in such a state and the braking force acts only on the tractor, the braking force will differ between the tractor and the trailer. This further adversely affects the behavior of the vehicle.

In the above structure, when the tractor and the trailer are coupled, a failure has been detected in the second actuator control unit that brakes the trailer, and the vehicle is not traveling straight, the brake controller prohibits execution of the automatic brake control. This limits increases in the difference in braking force between the tractor and the trailer that would result from execution of the automatic brake control when the vehicle is not traveling straight. Thus, adverse effects on the behavior of the vehicle are limited in a state in which the behavior of the vehicle will be adversely affected by the difference in braking force between the tractor and the trailer. This limits adverse effects on the behavior of the vehicle resulting from differences in the braking force between the tractor and the trailer.

In the brake controller of each of the aspects, it is preferred that the execution unit be configured so that when prohibited by the prohibition unit from executing the automatic brake control, the execution unit controls the first control unit in accordance with the distance detected by the distance sensor and executes an abnormal state brake control instead of the automatic brake control to brake the vehicle. It is also preferred that the first brake device generate a smaller braking force in the abnormal state brake control than in the automatic brake control.

In the above structure, when the abnormal state brake control brakes the tractor with a smaller braking force than the braking force of the automatic brake control. This applies the brakes to the vehicle while minimizing the difference in braking force between the tractor and the trailer.

A third aspect provides a method for controlling a brake applied to a vehicle that includes a tractor and a trailer towed by the tractor. The method includes controlling a first brake device installed in the tractor with a first braking unit, controlling a second brake device installed in the trailer with a second braking unit, detecting a distance between the vehicle and an object located near the vehicle, controlling the first braking unit and the second braking unit in accordance with the detected distance and executing an automatic brake control that brakes the vehicle, detecting that the tractor and the trailer are coupled to each other, diagnosing the second braking unit for a failure, and prohibiting execution of the automatic brake control under the condition that the tractor and the trailer are detected as being coupled and the second braking unit is diagnosed as including a failure.

A fourth aspect provides a method for controlling a brake applied to a vehicle that includes a tractor and a trailer towed by the tractor. The method includes controlling a first brake device installed in the tractor with a first braking unit, controlling a second brake device installed in the trailer with a second braking unit, detecting a distance between the vehicle and an object located near the vehicle, controlling the first braking unit and the second braking unit in accordance with the detected distance and executing an automatic brake control that brakes the vehicle, detecting that the tractor and the trailer are coupled to each other, diagnosing the second braking unit for a failure, detecting a traveling state of the vehicle; determining whether or not the vehicle is traveling straight, and prohibiting execution of the automatic brake control under the condition that the tractor and the trailer are detected as being coupled, the second braking unit is diagnosed as including a failure, and that the vehicle is determined as not traveling straight.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of a brake controller and a method for controlling a brake will now be described with reference to FIGS. 1 and 2.

Figure 1:
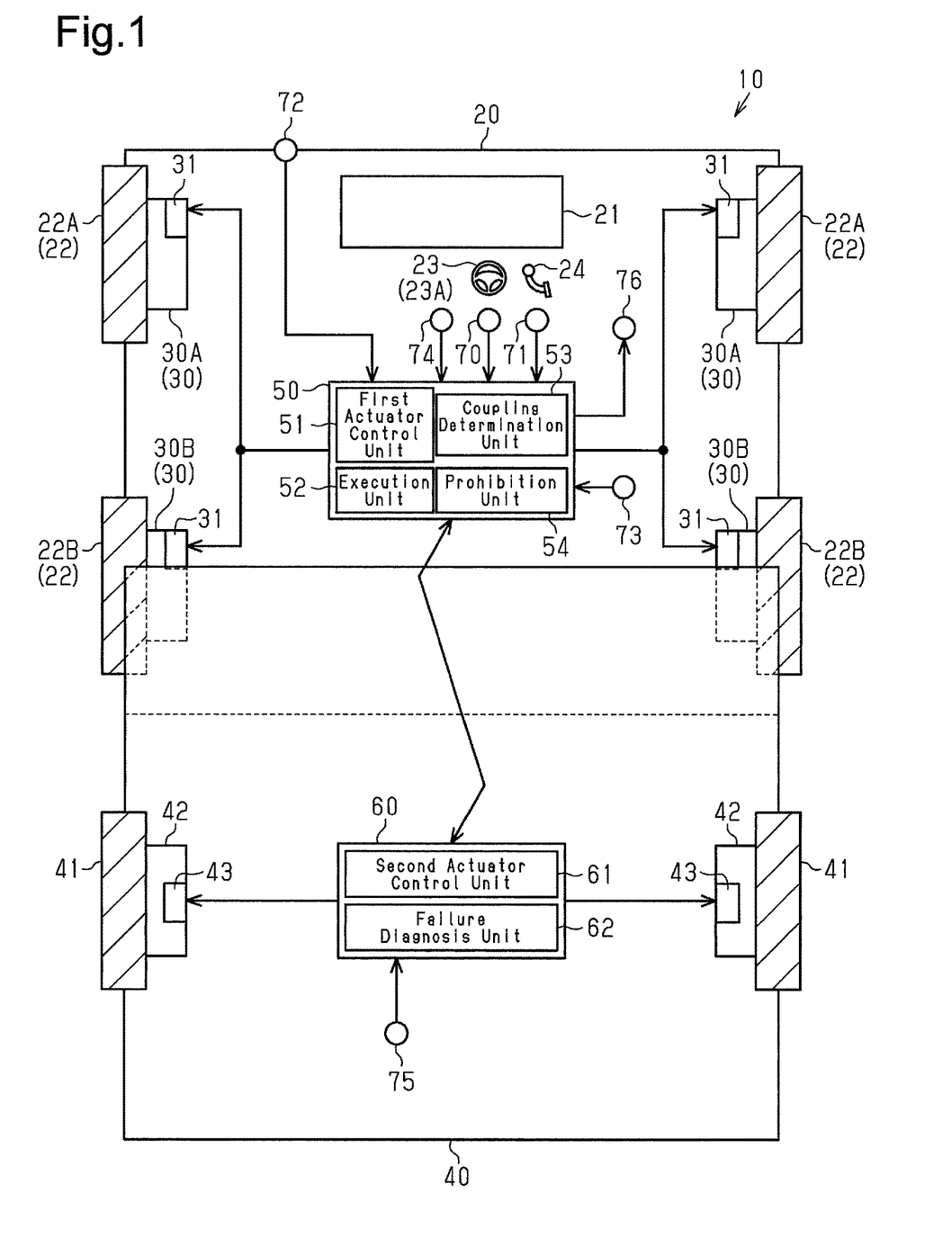
FIG. 1 is a schematic diagram showing the configuration of a first embodiment of a brake controller.

As shown in FIG. 1, a vehicle 10 includes a tractor 20 and a trailer 40 coupled to the tractor 20. The tractor 20 includes an internal combustion engine 21 serving as a drive source. The tractor 20 includes drive wheels 22. The drive wheels 22 include two front wheels 22A, which are located on the front left and front right sides of the vehicle (upper side in FIG. 1) spaced apart from each other, and two rear wheels 22B, which are located on the rear left and rear right sides of the vehicle spaced apart from each other. The internal combustion engine 21 transmits drive force to the drive wheels 22. The tractor 20 includes a plurality of first brake devices 30, each corresponding to one of the drive wheels 22. That is, the first brake devices 30 include two front first brake devices 30A, which respectively correspond to the two front wheels 22A, and two rear first brake devices 30B, which respectively correspond to the two rear wheels 22B. Each of the first brake devices 30 includes a first brake actuator 31 that produces braking force.

Further, a steering device 23 and a brake pedal 24 are arranged near a driver seat in the tractor 20. The steering device 23 includes a steering wheel 23A operated by the driver. The tractor 20 includes a steering angle sensor 70 configured to detect a rotation angle of the steering wheel 23A and a stroke sensor 71 configured to detect the depression amount of the brake pedal 24. The tractor 20 includes a distance sensor 72 located on the front end of the tractor 20 and configured to detect the distance between the vehicle 10 and an object located near the vehicle 10. The distance sensor 72 is, for example, an ultrasonic sensor that detects the distance to an object located in front of the vehicle 10 by transmitting ultrasonic waves toward the front of the vehicle. The tractor 20 further includes a coupling detection sensor 73 located on the rear end of the tractor 20 and configured to detect that the tractor 20 and the trailer 40 are coupled to each other. The coupling detection sensor 73 detects that the trailer 40 is coupled when, for example, a terminal (not shown) at a front end of the trailer 40, is coupled to the coupling detection sensor 73.

The tractor 20 includes a first controller 50. The first controller 50 receives output signals from the steering angle sensor 70, the stroke sensor 71, the distance sensor 72, and the coupling detection sensor 73. Further, the first controller 50 receives an output signal from a vehicle speed sensor 74 configured to detect the speed of the vehicle 10.

The trailer 40 is coupled to the tractor 20 by overlapping the front end of the trailer 40, which opposes the tractor 20, with the rear end of the tractor 20. The trailer 40 includes two driven wheels 41, which are located on the left and right sides and spaced apart from each other. The trailer 40 includes two second brake devices 42, each corresponding to one of the two driven wheels 41. Each of the second brake devices 42 includes a second brake actuator 43 that generates braking force. The trailer 40 further includes a second controller 60. The second controller 60 is configured to perform bidirectional communication with the first controller 50 via an on-board network such as a controller area network (CAN). The second controller 60 receives an output signal from a weight sensor 75 configured to detect the payload of the trailer 40.

The first controller 50 includes a first actuator control unit 51, an execution unit 52, a coupling determination unit 53, and a prohibition unit 54. Further, the second controller 60 includes a second actuator control unit 61 and a failure diagnosis unit 62.

The internal combustion engine 21 transmits driving force to the drive wheels 22 of the tractor 20. This rotates the drive wheels 22 and moves the tractor 20. Further, the trailer 40, which is towed by the tractor 20, moves as its driven wheels 41 rotate. When the driver operates the brake pedal 24, the first controller 50 receives an output signal corresponding to the operation amount from the stroke sensor 71. The first actuator control unit 51 of the first controller 50 calculates a suitable braking force for the tractor 20 based on the output signals of the stroke sensor 71, the vehicle speed sensor 74, and the like and controls the first brake actuators 31 of the first brake devices 30 to obtain the braking force. That is, each first brake actuator 31 is driven by a drive signal from the first actuator control unit 51 to generate a suitable braking force with the first brake device 30. In addition, the first controller 50 transmits a brake-related signal to the second controller 60 via the on-board network.

The second actuator control unit 61 of the second controller 60 calculates a suitable braking force for the trailer 40 based on the brake-related signal, which has been transmitted from the first controller 50, and the output signal of the weight sensor 75. The braking force is calculated so that the decelerated speed of the trailer 40 is equal to the decelerated speed of the tractor 20 when the first actuator control unit 51 controls the first brake actuators 31. The second actuator control unit 61 controls the second brake actuators 43 of the second brake devices 42 to obtain the calculated braking force.

The first brake devices 30 and the second brake devices 42 are coupled to the brake pedal 24 by air hoses (not shown). An air signal produced by operating the brake pedal 24 is transmitted through the air hoses to the first brake devices 30 and the second brake devices 42 to generate braking force with the brake devices 30 and 42. The tractor 20 includes a first interruption mechanism (not shown) that interrupts the transmission of an air signal through the air hoses. When the first actuator control unit 51 is normal, the first interruption mechanism interrupts the transmission of the air signal to the first brake devices 30 through the air hoses. When the first actuator control unit 51 includes a failure, the first interruption mechanism permits the transmission of the air signal to the first brake devices 30 through the air hoses. Further, the trailer 40 includes a second interruption mechanism (not shown) that interrupts the transmission of an air signal through the air hoses. When the second actuator control unit 61 is normal, the second interruption mechanism interrupts the transmission of the air signal to the second brake devices 42 through the air hoses. When the second actuator control unit 61 includes a failure, the second interruption mechanism permits the transmission of the air signal to the second brake devices 42 through the air hoses. Thus, even when the first actuator control unit 51 and the second actuator control unit 61 fail to function normally, the first brake device 30 and the second brake device 42 can be actuated when the driver operates the brake pedal 24.

Further, the execution unit 52 of the first controller 50 is configured to execute an automatic brake control that brakes the vehicle 10 by controlling the first actuator control unit 51 and the second actuator control unit 61 in accordance with the distance between the vehicle 10 and an object located near the vehicle detected by the distance sensor 72. In the present embodiment, the execution unit 52 sets an execution condition in which the distance detected by the distance sensor 72 is less than or equal to a predetermined distance and determines whether or not the execution condition has been satisfied in predetermined cycles. When the execution condition has been satisfied, the execution unit 52 controls the first actuator control unit 51 and the second actuator control unit 61 to generate braking force with each of the brake devices 30 and 42 regardless of operation of the brake pedal 24. For example, a map is used to calculate the braking force that increases as the distance decreases. This brakes the vehicle 10 when there is a possibility that the vehicle 10 will hit the object located in front of the vehicle.

In the present embodiment, the first actuator control unit 51 corresponds to a first brake unit that controls the first brake devices 30 installed in the tractor 20, and the second actuator control unit 61 corresponds to a second brake unit that controls the second brake devices 42 installed in the trailer 40.

The coupling determination unit 53 determines whether or not the tractor 20 and the trailer 40 are coupled based on an output signal from the coupling detection sensor 73. The coupling detection sensor 73 and the coupling determination unit 53 correspond to a coupling detection unit configured to detect that the tractor 20 and the trailer 40 are coupled to each other. The prohibition unit 54 is configured to prohibit the execution unit 52 from executing the automatic brake control.

The failure diagnosis unit 62 of the second controller 60 is configured to diagnose the second actuator control unit 61 with failures. The failure diagnosis unit 62 executes a failure diagnosis at a predetermined timing. When detecting a failure in the second actuator control unit 61, the failure diagnosis unit 62 stores information related to the failure detection.

As shown in FIG. 1, a notification lamp 76 is arranged near the driver seat in the tractor 20 to notify the driver of an abnormality in the automatic brake control of the brake controller.

As described above, the brake controller includes the first controller 50, the second controller 60, the steering angle sensor 70, the stroke sensor 71, the distance sensor 72, the coupling detection sensor 73, the vehicle speed sensor 74, the weight sensor 75, and the notification lamp 76. If the automatic brake control is executed when the second actuator control unit 61 that brakes the trailer 40 includes a failure, the difference in braking force increases between the tractor 20 and the trailer 40. In this case, the behavior of the vehicle 10 is adversely affected. In order to limit such adverse effects on the vehicle behavior, the brake controller executes a determination control that determines whether or not the automatic brake control can be executed.

A series of processes in the determination control executed by the brake controller will now be described with reference to the flowchart of FIG. 2. The brake controller repeatedly executes the series of processes in predetermined cycles.

Figure 2:
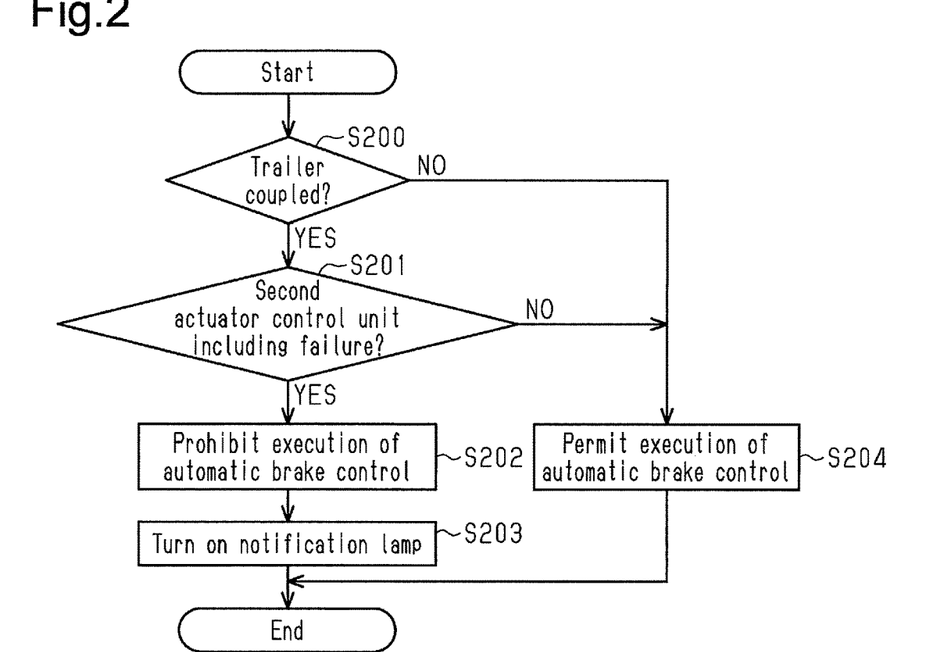
FIG. 2 is a flowchart showing a series of processes in a determination control executed by the brake controller.

As shown in FIG. 2, when starting the series of processes, the brake controller first determines whether or not the coupling detection unit has detected that the tractor 20 and the trailer 40 are coupled to each other (step S200). When the tractor 20 and the trailer 40 have been detected as being coupled to each other (step S200: YES), the brake controller then determines whether or not the failure diagnosis unit 62 is storing a failure detection of the second actuator control unit 61 (step S201). A case in which the process of step S201 results in an affirmative determination (step S201: YES) indicates that the tractor 20 is coupled to the trailer 40 and the second actuator control unit 61 includes a failure. Thus, the execution of the automatic brake control in this state may increase the difference in braking force between the tractor 20 and the trailer 40. Accordingly, the brake controller proceeds to step S202, and the prohibition unit 54 prohibits the execution unit 52 from executing the automatic brake control. In this case, even if the execution condition of the automatic brake control is subsequently satisfied, the automatic brake control is not executed. The brake controller then proceeds to step S203 and turns on the notification lamp 76 to notify the driver of an abnormality in the automatic brake control. Then, the series of processes in this determination control cycle is terminated.

When determining in the process of step S201 that the failure diagnosis unit 62 is not storing a failure detection (step S201: NO), the brake controller permits execution of the automatic brake control (step S204). Then, the series of processes in this determination control cycle is terminated. In this case, when the execution condition of the automatic brake control is subsequently satisfied, the execution unit 52 executes the automatic brake control.

In the process of step S200, when the brake controller determines that the tractor 20 and the trailer 40 have not been detected as being coupled to each other (step S200: NO), the brake controller proceeds to step S204 and permits execution of the automatic brake control. Then, the series of processes in this determination control cycle is terminated.

The present embodiment has the advantages described below.

(1) The present embodiment prohibits the automatic brake control when the tractor 20 and the trailer 40 are coupled and a failure is detected in the second actuator control unit 61 that brakes the trailer 40. This limits increases in the difference in braking force between the tractor 20 and the trailer 40 resulting from the execution of the automatic brake control. Thus, adverse effects on the behavior of the vehicle are limited because the difference in braking force between the tractor 20 and the trailer 40 is limited.

Second Embodiment

A second embodiment of a brake controller and a method for controlling a brake will now be described with reference to FIGS. 3 and 4.

Figure 3:
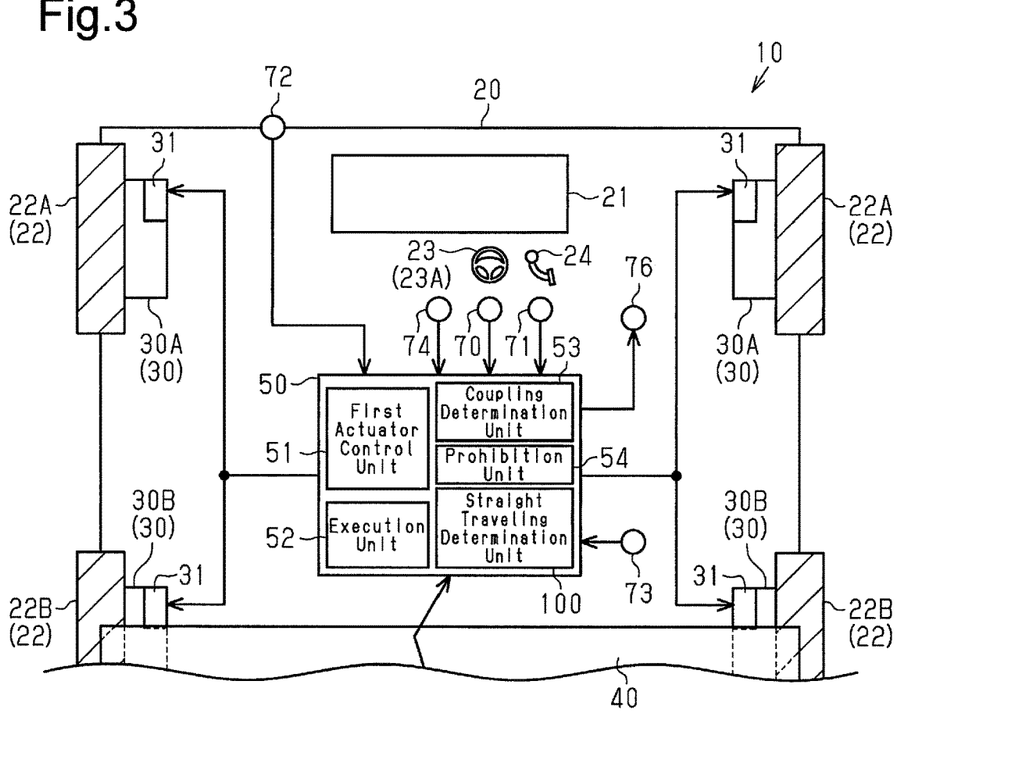
FIG. 3 is a schematic diagram showing part of the configuration of a second embodiment of a brake controller.

As shown in FIG. 3, the second embodiment differs from the first embodiment in that the first controller 50 of the brake controller includes a straight traveling determination unit 100 configured to determine whether or not the vehicle is traveling straight. The straight traveling determination unit 100 is configured to determine whether or not the vehicle 10 is traveling straight based on an output signal from the steering angle sensor 70. Thus, the steering angle sensor 70 corresponds to a traveling state detection unit that detects the traveling state of the vehicle 10. Otherwise, the structure of the second embodiment is the same as the first embodiment. Thus, like or same reference numerals are given to those components that are the same as the corresponding components of the first embodiment. Such components will not be described in detail.

A series of processes in a determination control executed by a brake controller of the present embodiment will now be described with reference to the flowchart of FIG. 4. The brake controller repeatedly executes the series of processes in predetermined cycles.

Figure 4:
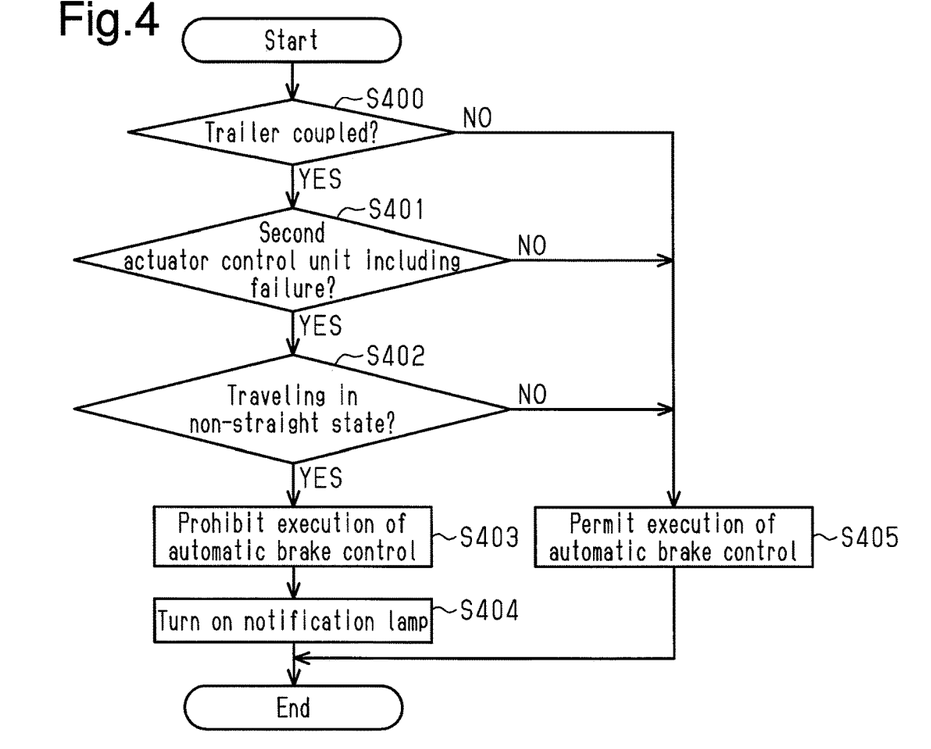
FIG. 4 is a flowchart showing a series of processes in a determination control executed by the brake controller of the second embodiment.

As shown in FIG. 4, when starting the series of processes, the brake controller first determines whether or not the coupling detection unit has detected that the tractor 20 and the trailer 40 are coupled to each other (step S400). When the tractor 20 and the trailer 40 are detected as being coupled to each other (step S400: YES), the brake controller determines whether or not the failure diagnosis unit 62 is storing a failure detection of the second actuator control unit 61 (step S401). When the failure diagnosis unit 62 is storing a failure detection of the second actuator control unit 61 (step S401: YES), the straight traveling determination unit 100 determines whether or not the vehicle 10 is traveling in a non-straight state (step S402). In this process, when the output signal of the steering angle sensor 70 does not correspond to a steering angle for driving the vehicle straight, the straight traveling determination unit 100 determines that the vehicle 10 is turning along a curved course and not traveling straight. When the process of step S402 results in an affirmative determination (step S402: YES), that is, when the trailer 40 is coupled to the tractor 20, the second actuator control unit 61 includes a failure, and the vehicle 10 is not traveling straight, the brake controller proceeds to step S403. In the process of step S403, the prohibition unit 54 prohibits the execution unit 52 from executing the automatic brake control. Subsequently, the brake controller proceeds to step S404 and turns on the notification lamp 76 to notify the driver of an abnormality in the automatic brake control. Then, the series of processes in this determination control is terminated.

In the process of step S402, when the brake controller determines that the vehicle 10 is traveling straight (step S402: NO), the brake controller proceeds to step S405 and permits execution of the automatic brake control. Then, the series of processes in this determination control is terminated.

In the process of step S401, when the brake controller determines that the failure diagnosis unit 62 is not storing a detection failure of the second actuator control unit 61 (step S401: NO), the execution of the automatic brake control is permitted (step S405). Then, the series of processes in this determination control cycle is terminated.

Further, in the process of step S400, when the brake controller determines that the tractor 20 and the trailer 40 have not been detected as being coupled to each other (step S400: NO), the brake controller proceeds to step S405 and permits execution of the automatic brake control. Then, the series of processes in this determination control cycle is terminated.

The present embodiment has the advantage described below.

(2) When the vehicle 10 is not traveling straight, that is, when the vehicle 10 is turning along a curved route, the application of brakes to the vehicle 10 will result in the inertial force of the tractor 20 and the inertial force of the trailer 40 acting in different directions. This adversely affects the behavior of the vehicle. When the automatic brake control is executed in such a state and the braking force acts only on the tractor 20, the braking force will differ between the tractor 20 and the trailer 40. This further adversely affects the behavior of the vehicle.

In the present embodiment, when the tractor 20 and the trailer 40 are coupled, a failure has been detected in the second actuator control unit 61 that brakes the trailer 40, and the vehicle 10 is not traveling straight, the brake controller prohibits execution of the automatic brake control. This limits increases in the difference in braking force between the tractor 20 and the trailer 40 that would result from execution of the automatic brake control when the vehicle 10 is not traveling straight. Thus, adverse effects on the behavior of the vehicle 10 are limited in a state in which the behavior of the vehicle 10 will be adversely affected by the difference in braking force between the tractor 20 and the trailer 40. This limits adverse effects on the behavior of the vehicle 10 resulting from differences in the braking force between the tractor 20 and the trailer 40.

When the brakes are applied to the vehicle 10 while the vehicle 10 is traveling straight, the inertial force of the tractor 20 and the inertial force of the trailer 40 act in the same direction. Thus, when the tractor 20 receives the inertial force acting from the trailer 40 toward the tractor 20 during execution of the automatic brake control, the behavior of the vehicle is only slightly affected. Accordingly, when the brake controller determines that the vehicle 10 is traveling straight, even if the second actuator control unit 61 includes a failure, the execution of the automatic brake control is permitted. This limits the adverse effects on the behavior of the vehicle 10 while maximizing the execution frequency of the automatic brake control.

Third Embodiment

A third embodiment of a brake controller and a method for controlling a brake will now be described with reference to FIG. 5. The third embodiment differs from the first embodiment in the series of processes in a determination control executed by the brake controller. Like or same reference numerals are given to those components that are the same as the corresponding components of the first embodiment. Such components will not be described in detail.

Figure 5:
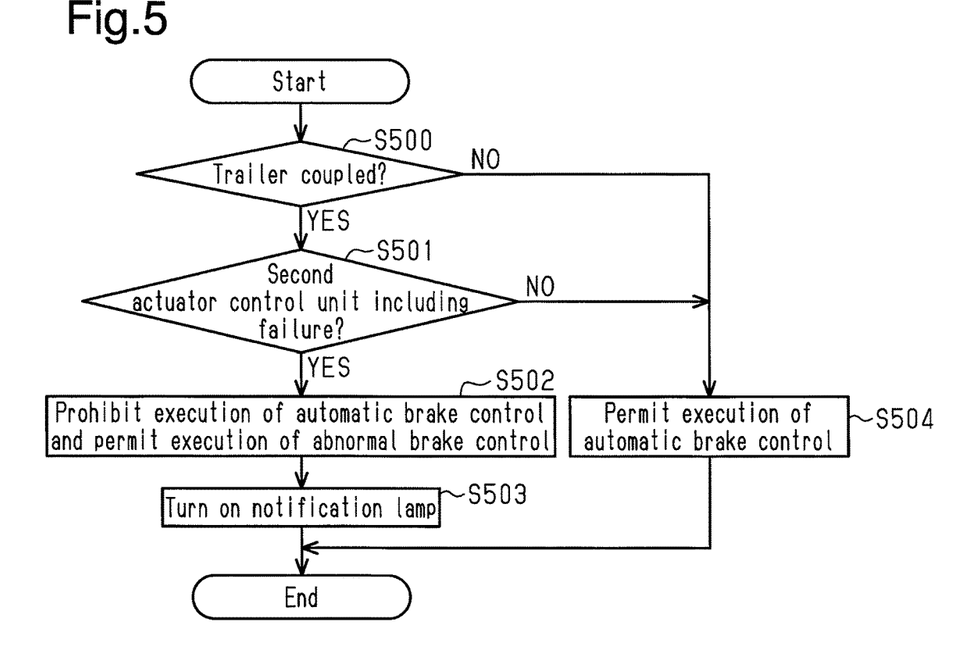
FIG. 5 is a flowchart showing a series of processes in a determination control executed by a third embodiment of a brake controller.

As shown in FIG. 5, the brake controller starts a series of processes in a determination control. First, the brake controller determines whether or not the coupling detection unit has detected that the tractor 20 and the trailer 40 are coupled to each other (step S500). When the tractor 20 and the trailer 40 have been detected as being coupled to each other (step S500: YES), the brake controller then determines whether or not the failure diagnosis unit 62 is storing a failure detection of the second actuator control unit 61 (step S501). When the second actuator control unit 61 is storing a failure detection of the second actuator control unit 61 (step S501: YES), the brake controller proceeds to step S502, and the prohibition unit 54 prohibits the execution unit 52 from executing the automatic brake control. When the prohibition unit 54 prohibits execution of the automatic brake control, the execution unit 52 executes, instead of the automatic brake control, an abnormal state brake control that brakes the vehicle in accordance with the distance between the vehicle 10 and an object located near the vehicle detected by the distance sensor 72. The abnormal state brake control sets an execution condition in which the distance detected by the distance sensor 72 is less than or equal to a predetermined distance and determines whether or not the execution condition has been satisfied in predetermined cycles. When the execution condition has been satisfied, the execution unit 52 controls the first actuator control unit 51 and generates braking force with the first brake device 30 regardless of operation of the brake pedal 24. For example, a map is used to calculate the braking force that increases as the distance decreases. The values in the map for the abnormal state brake control are set to be, for example, fifty percent smaller than the values of the map for the automatic brake control.

More specifically, when the distance detected by the distance sensor 72 is the same, the braking force generated in the abnormal state brake control by the first brake device 30 is smaller than the braking force generated in the automatic brake control by the first brake device 30. Thus, when the execution condition of the abnormal state brake control has been satisfied after the process of step S502, the braking force applied to the vehicle 10 is smaller than that when the automatic brake control is executed.

The brake controller then proceeds to step S503 and turns on the notification lamp 76 to notify the driver of an abnormality in the automatic brake control. Then, the series of processes in this determination control is terminated.

When the brake controller determines that the second actuator control unit 61 is not storing a failure detection (step S501: NO) and that the tractor 20 and the trailer 40 have not been detected as being coupled to each other (step S500: NO), the brake controller proceeds to step S504 and permits execution of the automatic brake control. Then, the series of processes in this determination control is terminated.

The present embodiment has the advantage described below in addition to advantage (1).

(3) When the second actuator control unit 61 includes a failure, the present embodiment prohibits execution of the automatic brake control and executes the abnormal state brake control instead of the automatic brake control. The abnormal state brake control determines whether or not the execution condition has been satisfied in predetermined cycles. When the execution condition has been satisfied and there is a possibility of the vehicle 10 hitting an object located in front of the vehicle, the abnormal state brake control brakes the tractor 20 with a smaller braking force than the braking force of the automatic brake control. This applies the brakes to the vehicle 10 when there is a possibility of the vehicle 10 hitting an object located in front of the vehicle while minimizing the difference in braking force between the tractor 20 and the trailer 40.

It should be apparent to those skilled in the art that the present invention may be embodied in many other specific forms without departing from the spirit or scope of the invention. Particularly, it should be understood that the present invention may be embodied in the following forms.

In the process of step S403 in the second embodiment, when the prohibition unit 54 prohibits execution of the automatic brake control, the execution unit 52 may execute the abnormal state brake control instead of the automatic brake control. In the process of step S502 of the third embodiment, during execution of the abnormal state brake control, the braking force generated when the vehicle 10 is traveling straight may differ from the braking force generated when the vehicle 10 is not traveling straight. In this case, when the distance detected by the distance sensor 72 is the same, it is preferred that the braking force generated when the vehicle 10 is not traveling straight be smaller than the braking force generated when the vehicle 10 is traveling straight.

The steering angle sensor 70 is used as an example of the traveling state detection unit. However, as long as a traveling state of the vehicle 10 can be detected, other structures may be used. A sensor such as a yaw-rate sensor that detects the turning angle about a vertical axis of the vehicle 10 may be used.

The failure diagnosis unit 62 subjects the second actuator control unit 61 to the abnormality diagnosis. Instead, the subject of abnormality diagnosis performed by the failure diagnosis unit 62 may be, for example, the second controller 60. In this case, when an abnormality is detected in the second controller 60, the failure diagnosis unit 62 determines the second actuator control unit 61 also as being abnormal.

The second controller 60 includes the failure diagnosis unit 62. Instead, the first controller 50 may include the failure diagnosis unit 62.

The failure diagnosis unit 62 executes a failure diagnosis at a predetermined timing and, when detecting a failure in the second actuator control unit 61, stores information related to the failure detection. However, the failure diagnosis unit 62 does not need to be configured in this manner. For example, a failure diagnosis may be executed in the processes of steps S201, S401, and S501 in each of the above embodiments. In this case, when the failure diagnosis unit 62 executes the failure diagnosis and detects a failure, the process of each of the steps S201, S401, and S501 results in an affirmative determination.

The distance sensor 72 does not have to be arranged at the front end of the tractor 20 and may be arranged at other portions such as a side end of the tractor 20. Further, as long as the first controller 50 receives an output signal of the distance sensor 72, the distance sensor 72 may be arranged on the trailer 40. Additionally, there may be a plurality of distance sensors 72.

The first brake device 30 uses a map to calculate the braking force generated in the automatic brake control and the abnormal state brake control so that the braking force increases as the distance decreases between the vehicle 10 and an object located near the vehicle and detected by the distance sensor 72. However, the braking force does not have to be calculated in this manner. For example, the braking force generated by the first brake device 30 in the automatic brake control and the abnormal state brake control may be fixed regardless of the distance detected by the distance sensor 72. In such a manner, when the braking force generated by the first brake device 30 is fixed in each brake control, a preset braking force for the abnormal state brake control is smaller than a preset braking force for the automatic brake control. Thus, the braking force generated by the first brake device 30 in the abnormal state brake control is smaller than the braking force generated by the first brake device 30 in the automatic time brake control.

The coupling detection unit is formed by the coupling detection sensor 73 and the coupling determination unit 53 of the first controller 50. The structure of the coupling detection unit may be changed as long as the tractor 20 and the trailer 40 can be detected as being coupled to each other. For example, the first controller 50 may include the coupling detection unit. The coupling detection unit can detect that the tractor 20 and the trailer 40 are coupled to each other when it can communicate with the second controller via the on-board network.

In the above example, the first controller 50 and the second controller 60 are connected to each other by the on-board network. However, as long as a signal can be transferred between the first controller 50 and the second controller 60, the first controller 50 and the second controller 60 do not have to be connected by the on-board network. For example, when the first controller 50 and the second controller 60 are electrically connected by a cable, the first controller 50 and the second controller 60 can perform bilateral communication with each other via the cable instead of the on-vehicle network.

The present examples and embodiments are to be considered as illustrative and not restrictive, and the invention is not to be limited to the details given herein, but may be modified within the scope and equivalence of the appended claims.

The invention claimed is:

1. A brake controller configured to be applied to a vehicle that includes a tractor and a trailer towed by the tractor, the brake controller comprising:
   a first braking unit configured to control a first brake device installed in the tractor;
   a second braking unit configured to control a second brake device installed in the trailer;
   a distance sensor configured to detect a distance between the vehicle and an object located near the vehicle;
   an execution unit configured to control the first braking unit and the second braking unit in accordance with the distance detected by the distance sensor and execute an automatic brake control that brakes the vehicle;
   a coupling detection unit configured to detect that the tractor and the trailer are coupled to each other;
   a failure diagnosis unit configured to diagnose the second braking unit with a failure; and
   a prohibition unit configured to prohibit the execution unit from executing the automatic brake control,
   wherein the prohibition unit is configured to prohibit the execution unit from executing the automatic brake control under the condition that the coupling detection unit has detected that the tractor and the trailer are coupled to each other and the failure diagnosis unit has detected that the second braking unit includes a failure.

2. The brake controller according to claim 1, wherein
   the execution unit is configured so that when prohibited by the prohibition unit from executing the automatic brake control, the execution unit controls the first control unit in accordance with the distance detected by the distance sensor and executes an abnormal state brake control instead of the automatic brake control to brake the vehicle, and
   the first brake device generates a smaller braking force in the abnormal state brake control than in the automatic brake control.

3. A brake controller configured to be applied to a vehicle that includes a tractor and a trailer towed by the tractor, the brake controller comprising:
   a first braking unit configured to control a first brake device installed in the tractor;
   a second braking unit configured to control a second brake device installed in the trailer;
   a distance sensor configured to detect a distance between the vehicle and an object located near the vehicle;
   an execution unit configured to control the first braking unit and the second braking unit in accordance with the distance detected by the distance sensor and execute an automatic brake control that brakes the vehicle;
   a coupling detection unit configured to detect that the tractor and the trailer are coupled to each other;
   a failure diagnosis unit configured to diagnose the second braking unit with a failure;
   a traveling state detection unit configured to detect a traveling state of the vehicle;
   a straight traveling determination unit configured to determine whether or not the traveling state detection unit has detected that the vehicle is traveling straight; and
   a prohibition unit configured to prohibit the execution unit from executing the automatic brake control,
   wherein the prohibition unit is configured to prohibit the execution unit from executing the automatic brake control under the condition that the coupling detection unit has detected that the tractor and the trailer are coupled to each other, the failure diagnosis unit has detected that the second braking unit includes a failure, and the straight traveling determination unit has determined that the vehicle is not traveling straight.

4. The brake controller according to claim 2, wherein the execution unit is configured so that when prohibited by the prohibition unit from executing the automatic brake control, the execution unit controls the first control unit in accordance with the distance detected by the distance sensor and executes an abnormal state brake control instead of the automatic brake control to brake the vehicle, and the first brake device generates a smaller braking force in the abnormal state brake control than in the automatic brake control.

5. A method for controlling a brake applied to a vehicle that includes a tractor and a trailer towed by the tractor, the method comprising:

controlling a first brake device installed in the tractor with a first braking unit;

controlling a second brake device installed in the trailer with a second braking unit;

detecting a distance between the vehicle and an object located near the vehicle;

controlling the first braking unit and the second braking unit in accordance with the detected distance and executing an automatic brake control that brakes the vehicle;

detecting that the tractor and the trailer are coupled to each other;

diagnosing the second braking unit for a failure; and prohibiting execution of the automatic brake control under the condition that the tractor and the trailer are detected as being coupled and the second braking unit is diagnosed as including a failure.

6. A method for controlling a brake applied to a vehicle that includes a tractor and a trailer towed by the tractor, the method comprising:

controlling a first brake device installed in the tractor with a first braking unit;

controlling a second brake device installed in the trailer with a second braking unit;

detecting a distance between the vehicle and an object located near the vehicle;

controlling the first braking unit and the second braking unit in accordance with the detected distance and executing an automatic brake control that brakes the vehicle;

detecting that the tractor and the trailer are coupled to each other;

diagnosing the second braking unit for a failure;

detecting a traveling state of the vehicle;

determining whether or not the vehicle is traveling straight;

and prohibiting execution of the automatic brake control under the condition that the tractor and the trailer are detected as being coupled, the second braking unit is diagnosed as including a failure, and that the vehicle is determined as not traveling straight.

* * * * *